United States Patent
Oh et al.

(10) Patent No.: US 8,437,713 B1
(45) Date of Patent: May 7, 2013

(54) WIRELESS TRANSMIT DIVERSITY CONTROL BY LOCATION OF A WIRELESS COMMUNICATION DEVICE

(75) Inventors: DaeSik Oh, Overland Park, KS (US); Louis Eric Wingo, Liberty, MO (US); Michael Cyril DeLaet, Foster City, CA (US)

(73) Assignee: Sprint Communications Company L.P., Overlank Park, KS (US)

( * ) Notice: Subject to any disclaimer, the term of this patent is extended or adjusted under 35 U.S.C. 154(b) by 141 days.

(21) Appl. No.: 13/028,830

(22) Filed: Feb. 16, 2011

(51) Int. Cl.
*H04B 7/02* (2006.01)
*H04B 1/04* (2006.01)

(52) U.S. Cl.
USPC ............... 455/101; 455/127.1; 455/127.5

(58) Field of Classification Search ........... 455/101, 455/127.5, 91, 574, 522, 127.1
See application file for complete search history.

(56) References Cited

U.S. PATENT DOCUMENTS

| | | | |
|---|---|---|---|
| 5,305,353 A | 4/1994 | Weerackody | |
| 5,614,514 A | 3/1997 | Axelsson et al. | |
| 6,366,568 B1 | 4/2002 | Bolgiano et al. | |
| 6,400,780 B1 | 6/2002 | Rashid-Farrokhi et al. | |
| 7,062,232 B2 | 6/2006 | Coan et al. | |
| 7,302,238 B2 | 11/2007 | Fujil | |
| 7,352,750 B2 * | 4/2008 | Igarashi et al. | 370/392 |
| 7,542,733 B1 * | 6/2009 | Ngan | 455/101 |
| 7,639,991 B2 * | 12/2009 | Kim et al. | 455/101 |
| 7,680,202 B2 | 3/2010 | Chan et al. | |
| 7,929,924 B2 * | 4/2011 | Kim et al. | 455/101 |
| 8,050,702 B2 * | 11/2011 | Iizuka et al. | 455/522 |
| 2005/0250531 A1 * | 11/2005 | Takebe et al. | 455/550.1 |
| 2006/0222122 A1 * | 10/2006 | Jung et al. | 375/347 |
| 2006/0233275 A1 | 10/2006 | Chen et al. | |
| 2008/0123768 A1 | 5/2008 | Harel et al. | |
| 2009/0191832 A1 | 7/2009 | Catreux-Erceg et al. | |

OTHER PUBLICATIONS

U.S. Appl. No. 12/981,157, filed Dec. 29, 2010.
George Lee, et al.; "Automatic Service Selection in Dynamic Wireless Network Environments," pp. 1-2; Computer Science and Artificial Intelligence Laboratory; Massachusetts Institute of Technology; Cambridge, MA.

* cited by examiner

*Primary Examiner* — Sonny Trinh (57) ABSTRACT

In a wireless communication device, a geographic location system determines a geographic location of the wireless communication device. A power monitoring system determines battery power status for the wireless communication device. A transmit diversity control system determines a transmit diversity instruction for the geographic location. The transmit diversity control system processes the transmit diversity instruction and the battery power status to select a transmit diversity mode (on/off). The transmit diversity control system controls a plurality of power amplifiers to implement the selected transmit diversity mode.

20 Claims, 5 Drawing Sheets

WIRELESS TRANSMIT DIVERSITY CONTROL BY LOCATION OF A WIRELESS COMMUNICATION DEVICE

TECHNICAL BACKGROUND

A wireless communication device, such as a phone or computer, propagates wireless signals over the air. To generate a wireless signal, the wireless communication device modulates a user data signal with a carrier signal to generate a corresponding Radio Frequency (RF) signal. The wireless communication device then amplifies the RF signal and drives an antenna with the high-power RF signal. Much of the battery power in the wireless communication device is consumed by the power amplifier that produces the high-power RF signal.

In the field of communications, transmit diversity refers to the redundant transmission of a user data signal. The redundant transmission may occur over separate paths and/or use separate transmitters. In a wireless communication device, transmit diversity entails the use of two power amplifiers to generate and transmit two high-power RF signals that each carry the same user data. Although transmit diversity consumes significant battery power, transmit diversity typically provides better bandwidth and range than a single-transmit approach without transmit diversity.

Some wireless communication devices include geographic location systems, such as Global Position Satellite (GPS) circuitry or radio triangulation circuitry. Wireless communication devices are also usually aware of the nearby base stations and their identifiers. In addition, wireless communication devices typically track their current battery charge and whether or not the battery is currently charging.

Overview

In a wireless communication device, a geographic location system determines a geographic location of the wireless communication device. A power monitoring system determines battery power status for the wireless communication device. A transmit diversity control system determines a transmit diversity instruction for the geographic location. The transmit diversity control system processes the transmit diversity instruction and the battery power status to select a transmit diversity mode (on/off). The transmit diversity control system controls a plurality of power amplifiers to implement the selected transmit diversity mode.

DETAILED DESCRIPTION

Figure 1:
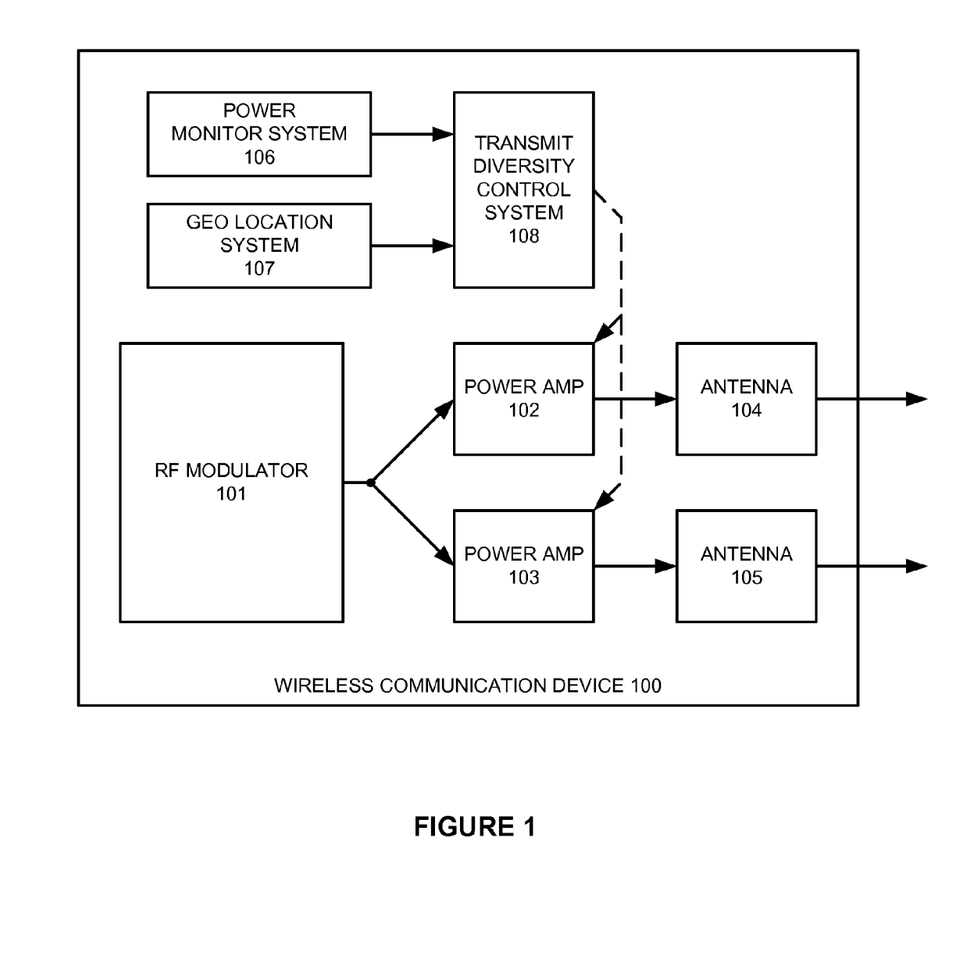
FIG. 1 illustrates a wireless communication device that controls its use of transmit diversity based on its geographic location.

FIG. 1 illustrates wireless communication device 100 that controls its use of transmit diversity based on its geographic location. Wireless communication device 100 comprises Radio Frequency (RF) modulator 101, power amplifiers 102-103, antennas 104-105, power monitor system 106, geographic location system 107, and transmit diversity control system 108. Note that some conventional aspects of wireless communication device 100 have been omitted for clarity, such as an enclosure, signal processors, battery, user interface, additional processing circuitry, and the like. Wireless communication device 100 could be a telephone, computer, media player, e-book, game console, Internet appliance, wireless network card, or some other user device capable of wireless communication using transmit diversity. Wireless network protocols that may be utilized by device 100 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), Wireless Fidelity (WiFi), Bluetooth, or some other wireless network protocol.

In operation, geographic location system 107 determines the current geographic location of wireless communication device 100. Geographic location system 107 may use: 1) Global Position Satellite (GPS) to obtain geographic coordinates, 2) radio triangulation to obtain geographic coordinates, 3) wireless communication to identify proximate Base Station Identifiers (BSIDs), or 4) some other technique to obtain geographic information. Power monitor system 106 determines the current status of battery power. The current status would typically indicate if the battery is charging and the amount of battery charge.

Transmit diversity control system 108 translates the geographic location into a transmit diversity instruction. This translation typically entails entering a data structure with the geographic location to yield the diversity instruction. The data structure may be stored internally or accessed remotely. In addition, the data structure may be modified by wireless communication device 100 or by an external system. The transmit diversity instructions would typically indicate that diversity is needed, diversity is objected to, or that diversity is optional. Alternatively, wireless communication device 100 may access a network control system to obtain transmit diversity instructions.

Although the data structure could be configured to achieve various goals, transmit diversity would be needed in geographic areas that are relatively distant from the network access points where transmit diversity is necessary for reliable wireless communication. Transmit diversity would be objected to in geographic areas that have high noise, such as dense urban areas. Note that the diversity objection may only be temporary during a particular high-noise event. Transmit diversity could be optional in geographic areas where noise is not excessive and where transmit diversity is not required for distant communications.

Transmit diversity control system 108 processes the transmit diversity instruction and the battery power status to select a transmit diversity mode—on or off. The logic used to make this selection is further detailed below. Transmit diversity control system 108 then controls power amplifiers 102-103 to implement the selected transmit diversity mode. If transmit diversity is turned on, then both power amplifiers 102-103 are powered up and used. If transmit diversity is turned off, then only one of the power amplifiers 102-103 is powered up and used.

The logic used to select the transmit diversity mode considers battery power status, transmit diversity instructions, and possibly other factors, such as the active applications on device 100. If wireless communication device 100 has an adequate power supply (battery charge above a threshold or connected to an external power supply), then transmit diversity would be ON if the diversity instruction indicates that transmit diversity is either needed or optional. If wireless communication device 100 has an adequate power supply, then transmit diversity would be OFF if the diversity instruction indicates that transmit diversity is objected to. If wireless communication device 100 has an inadequate power supply (battery charge below a threshold and not connected to an external power supply), then transmit diversity would be off, even if the diversity instruction indicates that transmit diversity is needed.

In some examples, the user may select a "battery save" setting for wireless communication device 100 indicating a desire to conserve battery life. If the battery power status is adequate and the transmit diversity instruction is optional, then transmit diversity would be OFF if the active applications on device 100 have a data rate below a threshold. Thus, wireless communication device 100 will not use transmit diversity for lower bandwidth applications to conserve the battery. If the battery power status is adequate and the transmit diversity instruction is optional, then transmit diversity would be ON if the active applications on device 100 have a data rate above a threshold. Thus, wireless communication device 100 will use transmit diversity for higher bandwidth applications even though more battery power is used.

In some examples, an active application on wireless communication device 100 has a high quality of service. For example, emergency calling may have a high quality of service relative to web browsing. Even if the transmit diversity instruction indicates an objection, transmit diversity would be ON if an active application has quality-of-service above a threshold (and battery power is adequate). For example, transmit diversity may stay ON for emergency response applications, even if the transmit diversity instruction indicates an objection to transmit diversity. Note that emergency response applications could include standard applications on a communication device that is operated by emergency personnel.

Figure 2:
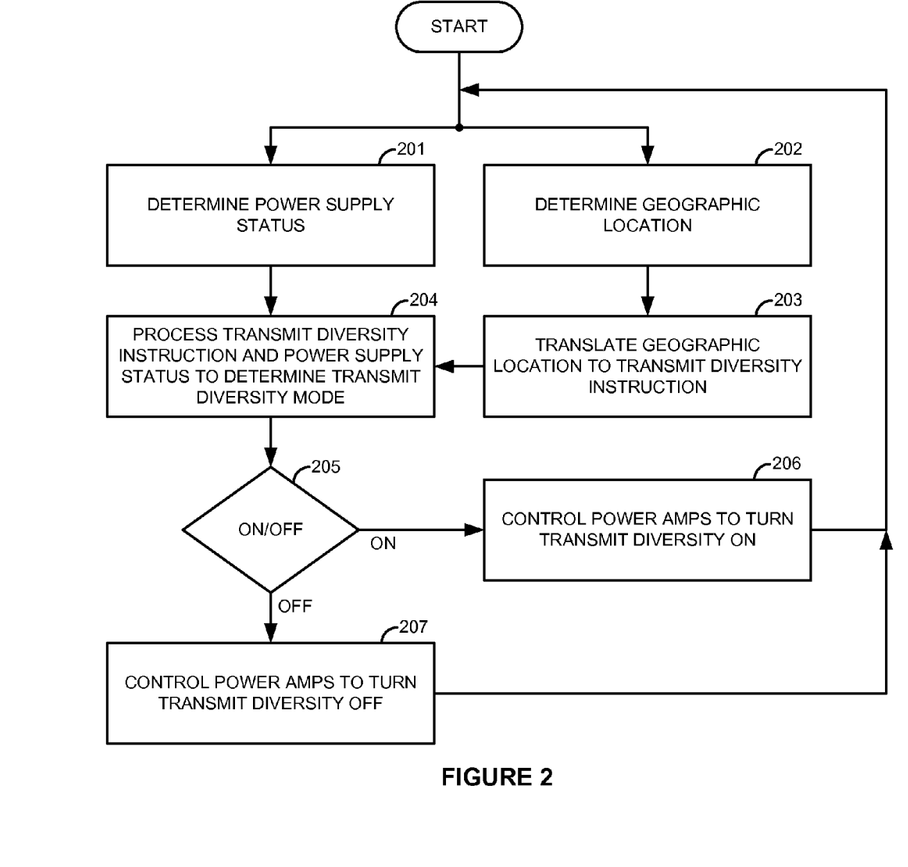
FIG. 2 illustrates the operation of the wireless communication device to control its use of transmit diversity based on its geographic location.

FIG. 2 illustrates the operation of wireless communication device 100 to control the use of transmit diversity based on geographic location. Power monitor system 106 determines the current status of battery power (201). The current status would typically indicate if the battery is charging and the amount of battery charge. Geographic location system 107 determines the current geographic location of wireless communication device 100 (202). The geographic location may comprise: GPS coordinates, proximate BSIDs, street address, or some other geographic information.

Transmit diversity control system 108 translates the geographic location into a transmit diversity instruction (203). Transmit diversity instructions would typically indicate: diversity needed, diversity objected to, or diversity optional. This translation typically entails entering a data structure with the geographic location to yield the diversity instruction. Although the data structure could be configured to achieve various goals, transmit diversity would typically be requested in geographic areas that are relatively distant from the network access points. Transmit diversity would typically be objected to in geographic areas that have high noise. Transmit diversity could be optional in geographic areas where noise is not excessive and where diversity is not required for distant communications.

Transmit diversity control system 108 processes the transmit diversity instruction and the battery power status to select a transmit diversity mode—on or off (204). If the selected transmit diversity mode is ON (205), then transmit diversity control system 108 controls power amplifiers 102-103 to implement transmit diversity—possibly by enabling power distribution to amplifiers 102-103 (206). If the selected transmit diversity mode is OFF (205), then transmit diversity control system 108 controls power amplifiers 102-103 to turn off transmit diversity—possibly by disabling power distribution to one of amplifiers 102-103 (207).

Figure 3:
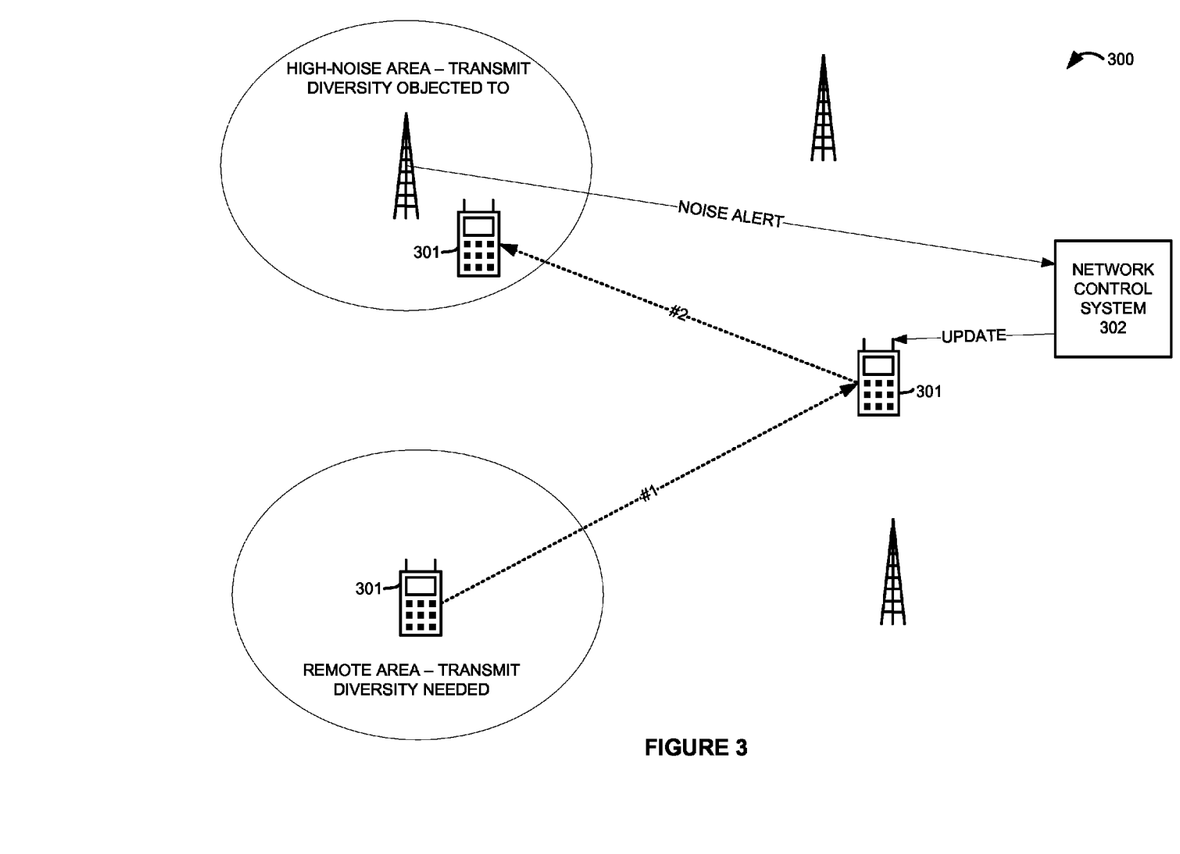
FIG. 3 illustrates a wireless communication system to control transmit diversity based on geographic location.

FIG. 3 illustrates wireless communication system 300 to control transmit diversity based on geographic location. The dotted and numbered arrows indicate the physical movement of wireless communication device 301. Prior to the first movement, wireless communication device 301 is located in a remote area, so the transmit diversity instruction for this geographic location would be transmit diversity needed. As a result, wireless communication device 301 would use transmit diversity unless the battery power falls below an adequate charge threshold.

After the first movement, wireless communication device 301 is in a geographic area that is no longer remote, and the new location does not have high noise, so the resulting transmit diversity instruction would be diversity optional. As a result, wireless communication device 301 would use transmit diversity unless the battery power falls below an adequate charge threshold. In examples where wireless communication device 301 is in a "battery save" mode, device 301 would use transmit diversity for high-bandwidth applications (battery permitting), but to save battery power, device 301 would not use transmit diversity for low-bandwidth applications.

Before the second movement, the geographic area at the top left of the figure begins to experience extremely high noise due to a traffic jam. Communication network equipment in the high-noise area transfers a high noise alert to network control system 302. In response to the noise alert, network control system 302 updates its data structure to change the transmit diversity instruction for the high-noise area from optional to objected to. Network control system 302 distributes this update to wireless communication device 301, and device 301 updates its own data structure to change the transmit diversity instruction for the high-noise area from optional to objected to.

Subsequently, wireless communication device 301 moves to the high-noise area (movement #2), and device 301 translates the new location into the transmit objected to instruction based on the updated data structure. As a result, wireless communication device 301 would not use transmit diversity—with some exceptions. In one exception, wireless communication device 301 would still use transmit diversity for an emergency application, such as a 911 call or text, as long as battery power permits. In another exception, wireless communication device 301 would still use transmit diversity for high quality-of-service applications, such as a premium video conferencing, as long as the battery power permits. Eventually, the high-noise condition would subside, and the transmit diversity instruction for the geographic area would be changed back to optional in a reciprocal manner.

In an alternative example, wireless communication device 301 queries network control system 302 with its current location as it moves about. Network control system 302 translates the location into the transmit diversity instruction and responds to wireless communication device 301 with the current instruction for that area. Wireless communication device 301 would process the response to determine the current transmit diversity instruction.

In another alternative example, network control system 302 tracks the location of wireless communication device 301 (possibly by serving base BSID), and control system 302 translates the location into the transmit diversity instruction.

Network control system 302 would transfer the transmit diversity instructions to wireless communication device 301—typically when the instruction changes. Wireless communication device 301 would process the messages from control system 302 to determine the current transmit diversity instruction.

Figure 4:
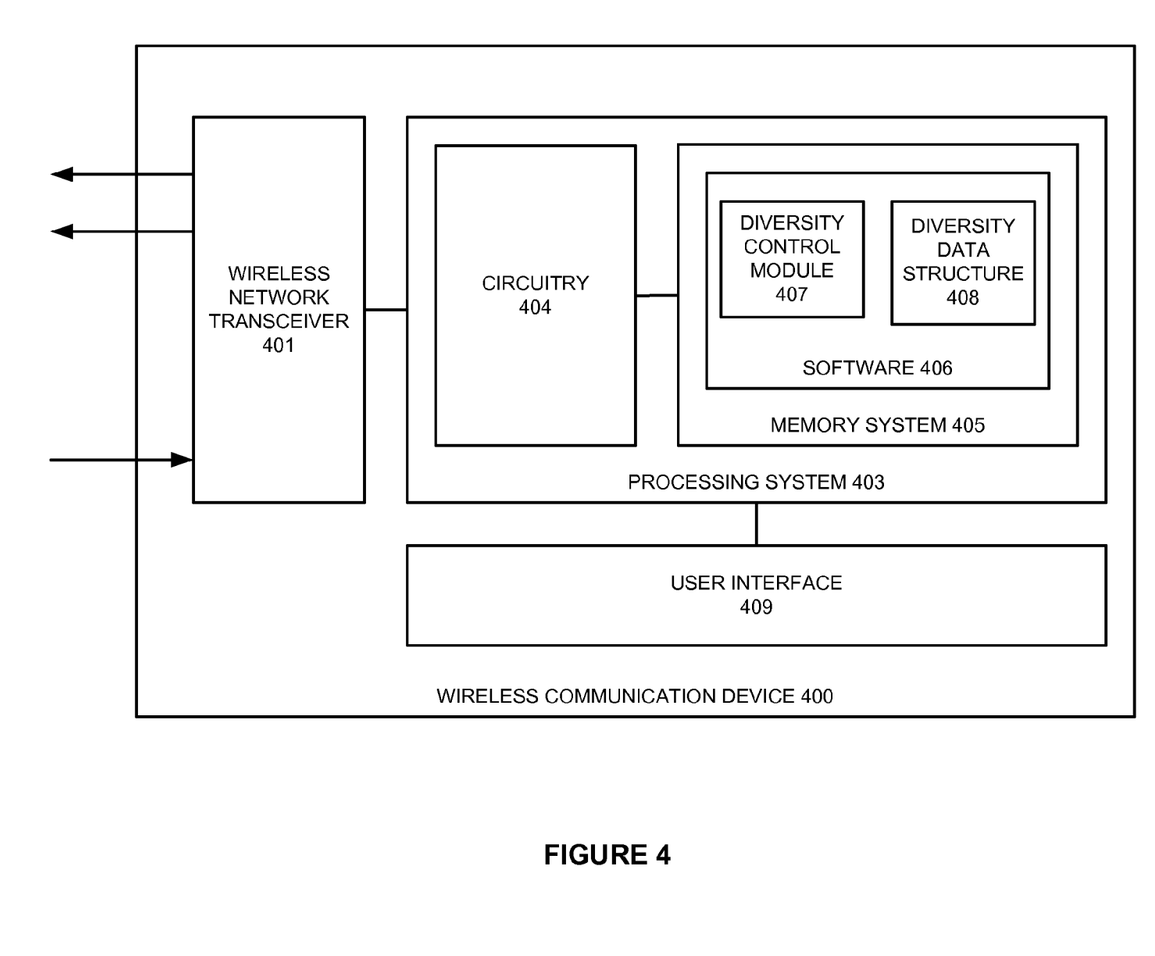
FIG. 4 illustrates a wireless communication device to control transmit diversity based on geographic location.

FIG. 4 illustrates wireless communication device 400 to control transmit diversity by geographic location. Wireless communication device 400 provides an example of wireless communication devices 100 and 301, although these devices may use alternative configurations. Wireless communication device 400 comprises wireless network transceiver 401, processing system 403, and user interface 409. Processing system 403 is linked to transceiver 401 and interface 409. Processing system 403 includes processing circuitry 404 and memory system 405 that stores operating software 406. Operating software 406 comprises transmit diversity control module 407 and transmit diversity data structure 408.

Wireless network transceiver 401 comprises components that communicate over wireless network links, such as antennas, amplifiers, RF processing circuitry and software, and/or some other communication components. Wireless network transceiver 401 may be configured to use Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), WiFi, Bluetooth, or some other wireless network protocol. Wireless transceiver 401 is configured to wirelessly transfer communications to wireless networks with or without using transmit diversity as directed by processing system 403.

User interface 409 comprises components to interact with a user, such as a display, touch-screen, microphone, speaker, buttons, switches, and the like. Some or all of user interface 409 could be omitted in some examples.

Processing circuitry 404 comprises microprocessor and other circuitry that retrieves and executes operating software 406 from memory system 405. Memory system 405 comprises a non-transitory storage medium, such as a disk drive, flash drive, data storage circuitry, or some other memory apparatus. Operating software 406 comprises computer programs, firmware, or some other form of machine-readable processing instructions. Operating software 406 may include an operating system, utilities, drivers, network interfaces, applications, or some other type of software. In this example, operating software 406 also comprises software module 407 and data structure 408, although software 406 could have alternative configurations.

When executed by processing circuitry 404, operating software 406 directs processing system 403 to operate as described herein for transmit diversity control. In particular, transmit diversity control module 407 obtains geographic location information and power supply status. Transmit diversity control module 407 enters diversity data structure 408 with the geographic location to determine the transmit diversity instruction. Transmit diversity control module 407 then processes the instruction and the power status to control whether transceiver 401 uses transmit diversity. Transmit diversity control module 407 may also consider the active applications running on device 400 as described above.

Transmit diversity data structure 408 would have geographic ranges stored in association with transmit diversity instructions. Periodically, wireless communication device 400 receives diversity control updates from a network control system, and control module 408 loads the updates into data structure 408.

Figure 5:
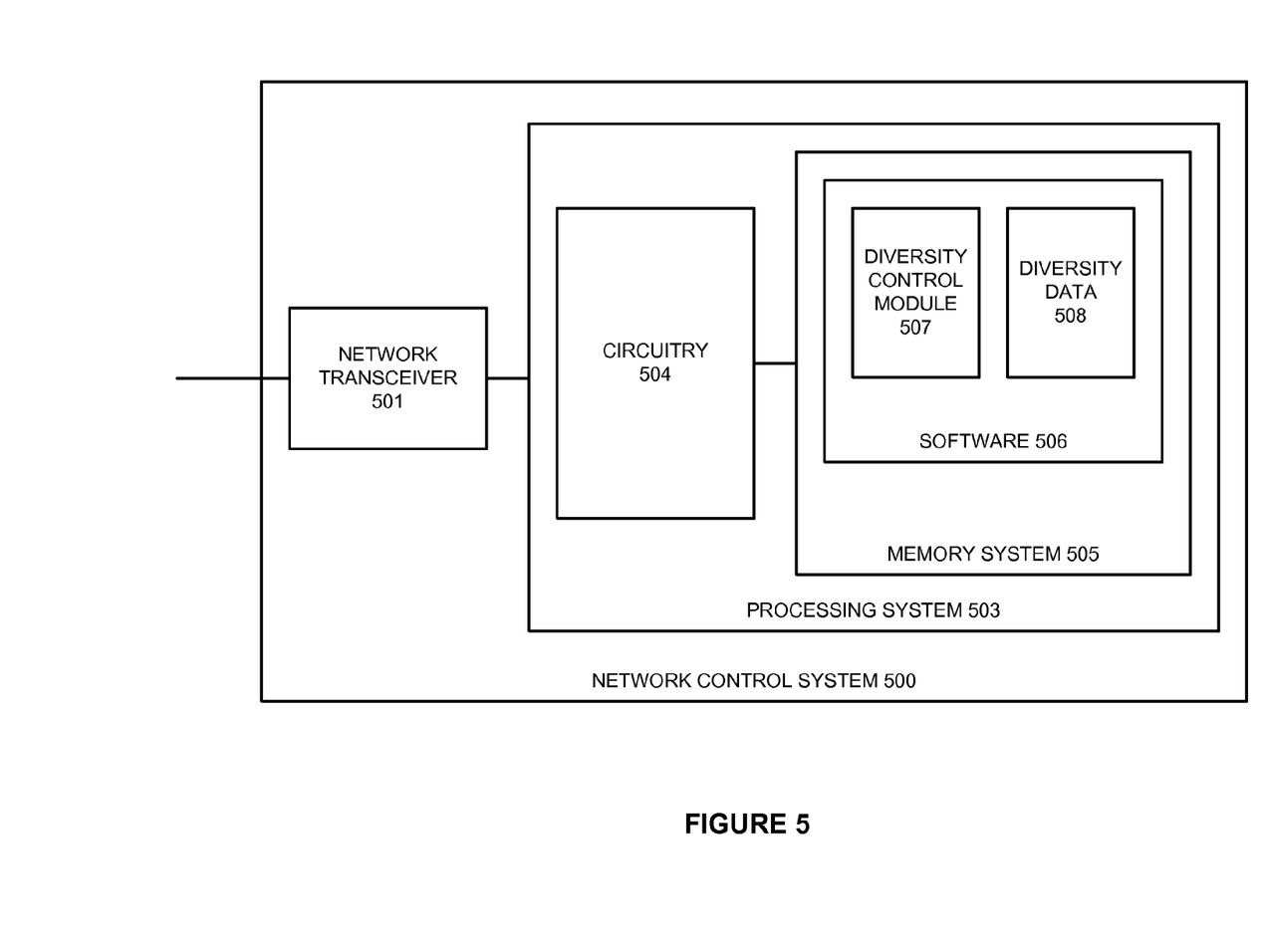
FIG. 5 illustrates a network control system to control transmit diversity based on geographic location.

FIG. 5 illustrates network control system 500 to control transmit diversity by geographic location. Network control system 500 provides an example of network control system 302, although system 302 may use alternative configurations. Network control system 500 comprises network transceiver 501 and processing system 503. Processing system 503 is linked to transceiver 501. Processing system 503 includes processing circuitry 504 and memory system 505 that stores operating software 506. Operating software 506 comprises transmit diversity control module 507 and transmit diversity data 508.

Network transceiver 501 comprises components that communicate over network links, such as network cards, ports, RF transceivers, processing circuitry and software, or some other communication components. Network transceiver 501 may be configured to communicate over metallic, wireless, or optical links. Network transceiver 501 may use various protocols including Ethernet, Internet protocol, time division multiplex, wireless, optical, and the like. Network transceiver 501 receives high-noise alerts and exchanges transmit diversity data with user communication devices.

Processing circuitry 504 comprises microprocessor and other circuitry that retrieves and executes operating software 506 from memory system 505. Memory system 505 comprises a non-transitory storage medium, such as a disk drive, flash drive, data storage circuitry, or some other memory apparatus. Operating software 506 comprises computer programs, firmware, or some other form of machine-readable processing instructions. Operating software 506 may include an operating system, utilities, drivers, network interfaces, applications, or some other type of software. In this example, operating software 506 also comprises software module 507 and data 508, although software 506 could have alternative configurations.

When executed by processing circuitry 504, operating software 506 directs processing system 503 to control transmit diversity by geographic location. In particular, diversity control module 507 receives noise information for geographic locations and updates the corresponding diversity instruction in data 508. Diversity control module 507 may also update user devices with data from data structure 408.

In an alternative example, diversity control module 507 tracks the locations of various user devices and pushes their current diversity control instructions to them. In another alternative, diversity control module 507 receives queries from the user devices, translates the device locations into diversity instructions using diversity data 408, and responds to the user devices with the appropriate diversity instructions.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, the method comprising:
   determining a geographic location of the wireless communication device;
   determining battery power status for the wireless communication device;

determining a transmit diversity instruction for the geographic location by processing a transmit diversity data structure relating a plurality of geographic locations to a plurality of transmit diversity instructions that indicate predetermined transmit diversity modes for the geographic locations;

processing the transmit diversity instruction and the battery power status to select a transmit diversity mode; and controlling a plurality of power amplifiers to implement the selected transmit diversity mode.

2. The method of claim 1 wherein:

the transmit diversity instruction indicates a need for transmit diversity;

the battery power status indicates an adequate power supply;

the selected transmit diversity mode comprises an on-mode; and processing the transmit diversity instruction and the battery power status to select the transmit diversity mode comprises processing the need for transmit diversity and the adequate power supply to select the on-mode.

3. The method of claim 1 wherein:

the transmit diversity instruction indicates a need for transmit diversity;

the battery power status indicates an inadequate power supply;

the selected transmit diversity mode comprises an off-mode; and processing the transmit diversity instruction and the battery power status to select the transmit diversity mode comprises processing the need for transmit diversity and the inadequate power supply to select the off-mode.

4. The method of claim 1 wherein:

the transmit diversity instruction indicates an objection to transmit diversity;

the battery power status indicates an adequate power supply;

the selected transmit diversity mode comprises an off-mode; and processing the transmit diversity instruction and the battery power status to select the transmit diversity mode comprises processing the objection to transmit diversity and the adequate power supply to select the off-mode.

5. The method of claim 4 wherein determining a transmit diversity instruction for the geographic location comprises:

maintaining the transmit diversity data structure;

receiving an instruction update for the geographic location and loading the instruction update for the geographic location into the transmit diversity data structure; and entering the updated transmit diversity data structure with the geographic location to yield the objection to transmit diversity, wherein the instruction update objecting to the transmit diversity for the geographic location is generated in response to wireless communication noise proximate to the geographic location.

6. The method of claim 1 wherein:

the transmit diversity instruction indicates an objection to transmit diversity;

the battery power status indicates an adequate power supply;

a device application is active that has a quality-of-service above a threshold; and processing the transmit diversity instruction and the battery power status to select the transmit diversity mode comprises processing the objection to transmit diversity, the adequate power supply, and the above-threshold quality-of-service to select an on-mode for the transmit diversity mode.

7. The method of claim 1 wherein:

the transmit diversity instruction indicates an option for transmit diversity;

the battery power status indicates a battery save setting;

a device application is active that requires a data rate above a threshold; and processing the transmit diversity instruction and the battery power status to select the transmit diversity mode comprises processing the option for transmit diversity, the battery save setting, and the above-threshold data rate requirement to select an on-mode for the transmit diversity mode.

8. The method of claim 1 wherein:

the transmit diversity instruction indicates an option for transmit diversity;

the battery power status indicates a battery save setting;

a device application is active that requires a data rate below a threshold; and processing the transmit diversity instruction and the battery power status to select the transmit diversity mode comprises processing the option for transmit diversity, the battery save setting, and the below-threshold data rate requirement to select an off-mode for the transmit diversity mode.

9. The method of claim 1 wherein the geographic location comprises geographic coordinates.

10. The method of claim 1 wherein the geographic location comprises a base station identifier.

11. A wireless communication device comprising:

a geographic location system configured to determine a geographic location of the wireless communication device;

a power monitoring system to determine battery power status for the wireless communication device; and a transmit diversity control system configured to determine a transmit diversity instruction for the geographic location by processing a transmit diversity data structure relating a plurality of geographic locations to a plurality of transmit diversity instructions that indicate predetermined transmit diversity modes for the geographic locations, process the transmit diversity instruction and the battery power status to select a transmit diversity mode, and control a plurality of power amplifiers to implement the selected transmit diversity mode.

12. The wireless communication device of claim 11 wherein:

the transmit diversity instruction indicates a need for transmit diversity;

the battery power status indicates an adequate power supply;

the selected transmit diversity mode comprises an on-mode; and the transmit diversity control system is configured to process the need for transmit diversity and the adequate power supply to select the on-mode.

13. The wireless communication device of claim 11 wherein:

the transmit diversity instruction indicates a need for transmit diversity;

the battery power status indicates an inadequate power supply;

the selected transmit diversity mode comprises an off-mode; and the transmit diversity control system is configured to process the need for transmit diversity and the inadequate power supply to select the off-mode.

14. The wireless communication device of claim 11 wherein:
   the transmit diversity instruction indicates an objection to transmit diversity;
   the battery power status indicates an adequate power supply;
   the selected transmit diversity mode comprises an off-mode; and
   the transmit diversity control system is configured to process the objection to transmit diversity and the adequate power supply to select the off-mode.

15. The wireless communication device of claim 14 wherein the transmit diversity control system is configured to:
   maintain the transmit diversity data structure;
   receive an instruction update for the geographic location and load the instruction update for the geographic location into the transmit diversity data structure; and
   enter the updated transmit diversity data structure with the geographic location to yield the objection to transmit diversity, wherein the instruction update objecting to the transmit diversity for the geographic location is generated in response to wireless communication noise proximate to the geographic location.

16. The wireless communication device of claim 11 wherein:
   the transmit diversity instruction indicates an objection to transmit diversity;
   the battery power status indicates an adequate power supply;
   a device application is active that has a quality-of-service above a threshold; and
   the transmit diversity control system is configured to process the objection to transmit diversity, the adequate power supply, and the above-threshold quality-of-service to select an on-mode for the transmit diversity mode.

17. The wireless communication device of claim 11 wherein:
   the transmit diversity instruction indicates an option for transmit diversity;
   the battery power status indicates a battery save setting;
   a device application is active that requires a data rate above a threshold; and
   the transmit diversity control system is configured to process the option for transmit diversity, the battery save setting, and the above-threshold data rate requirement to select an on-mode for the transmit diversity mode.

18. The wireless communication device of claim 11 wherein:
   the transmit diversity instruction indicates an option for transmit diversity;
   the battery power status indicates a battery save setting;
   a device application is active that requires a data rate below a threshold; and
   the transmit diversity control system is configured to process the option for transmit diversity, the battery save setting, and the below-threshold data rate requirement to select an off-mode for the transmit diversity mode.

19. The wireless communication device of claim 11 wherein the geographic location comprises geographic coordinates.

20. The wireless communication device of claim 11 wherein the geographic location comprises a base station identifier.

* * * * *